P. W. MACKENZIE.
Cupola Furnace.
No. 1,843. Reissued Dec. 27, 1864.
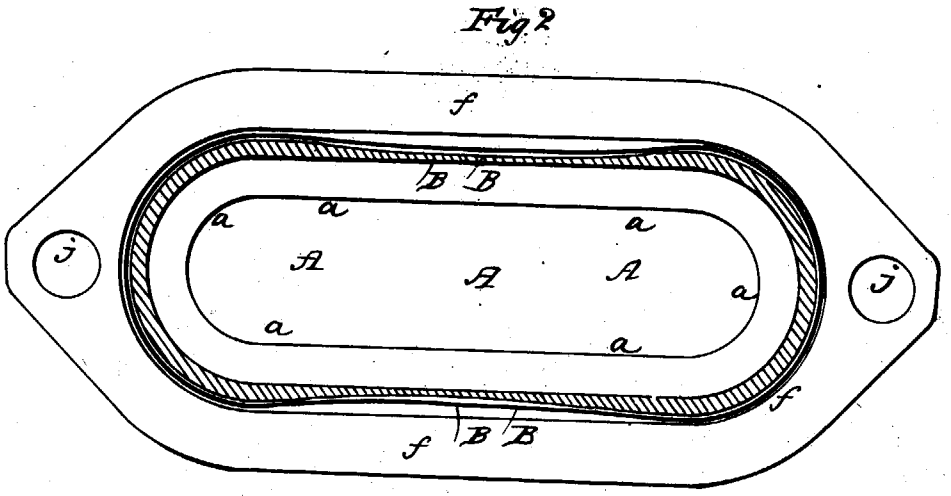
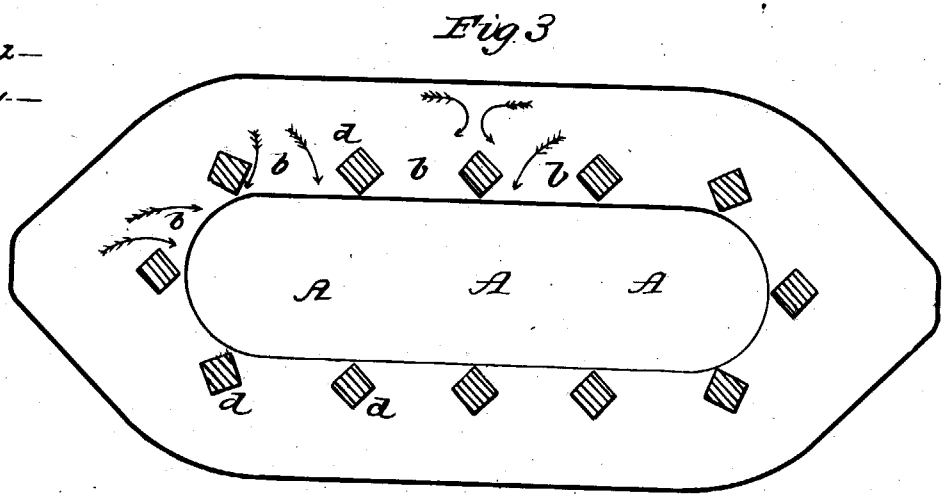
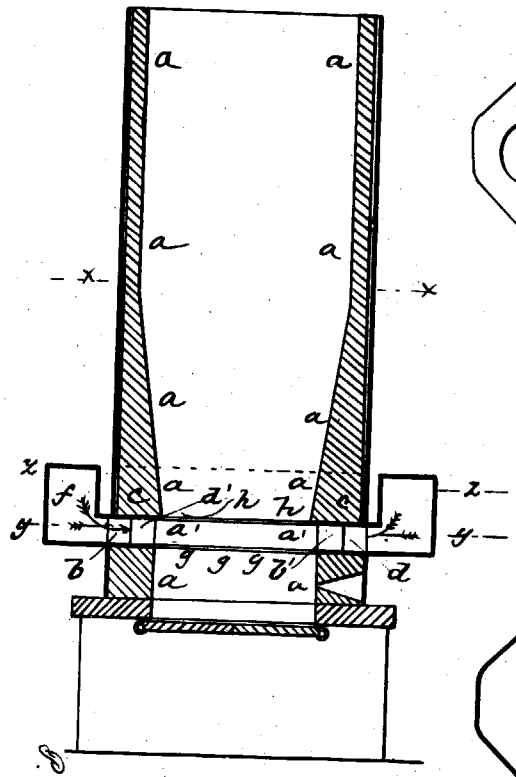
INVENTOR
P. W. Mackenzie
N. PETERS. Photo-Lithographer, Washington, D. C.

UNITED STATES PATENT OFFICE.

ADDISON SMITH AND JAMES M. SAYRE, OF NEW YORK, N. Y., ASSIGNEES, BY MESNE ASSIGNMENTS, OF PHILIP W. MACKENZIE, OF JERSEY CITY, NEW JERSEY.

IMPROVEMENT IN CUPOLA AND OTHER FURNACES.

Specification forming part of Letters Patent No. 18,051, dated August 25, 1857; Reissue No. 1,403 dated February 10, 1863; Reissue No. 1,843, dated December 27, 1864.

*To all whom it may concern:*

Be it known that PHILIP W. MACKENZIE, of Jersey City, in the county of Hudson and State of New Jersey, has invented certain new and useful Improvements in Cupola-Furnaces for Melting Iron, and also in Blast-Furnaces; and we do hereby declare the following to be a full, clear, and exact description thereof, reference being had to the accompanying drawings, making part of this specification, and to the letters of reference marked thereon.

Previous to his invention considerable trouble and expense has arisen in the use of cupolas, as heretofore constructed, consequent to the bursting of the "shell," caused by the expansion of the inclosed brick-work on becoming heated. He has effectually overcome all such difficulty by the first part or feature of his invention, which consists in making the cupola of an elongated form, (in cross-section,) and its sides more or less curved inward toward their middle portions, so that as the brick-work expands the surrounding shell or case (of metal) will have its curved sides straightened and thus become larger to accommodate the expanded brick-work, all as hereinafter more fully explained.

One of the greatest difficulties encountered in the working of cupola and blast furnaces has been to thoroughly penetrate the entire mass of fuel and metal by the blast without having the latter too strong (in which event the metal is too much decarbonized.) He has successfully overcome this difficulty and rendered the furnace capable of melting with much less fuel much more rapidly and producing the liquid metal at a higher temperature than could furnaces as heretofore constructed. By the second part or feature of his invention, which consists in surrounding the cupola by a continuous air-chamber so constructed and arranged with the cupola that the blast shall enter below the bosh all around the contained mass of material in a thin sheet or sheets, substantially as hereinafter explained; and also by the third part of his invention, which consists in making the bosh of the furnace of an elongated form, with its sides nearly or quite straight and introducing the blast all along said sides, substantially as hereinafter explained, whereby the mass of material in the bosh of the furnace has to assume the form of a long narrow strip, which the blast, entering from and along both sides, can easily and thoroughly penetrate. Considerable difficulty has arisen in the use of furnaces, as heretofore constructed, from the liability of the molten metal and other material clogging up or catling over the mouths of the tuyere through which the blast escaped into the bosh of the furnace. He has successfully obviated this difficulty by the fourth part of his invention, which consists in making the bosh of the furnace to project (inwardly) over the hearth where the blast enters, as will be presently more fully explained, whereby the liquid metal and other material, flowing or descending from the bosh into the hearth, will pass entirely clear of the mouth of the tuyere, (or the opening through which the blast enters the furnace,) in lieu of having a tendency to trickle into and choke up the said mouth or opening, as heretofore.

To enable those skilled in the art to more fully understand his several features of improvement, and to construct and use a furnace embodying his invention, we will now proceed to describe the construction and operation of his improved furnace.

In the accompanying drawings, Figure 1 is a vertical cross-section of his improved cupola, taken in a plane which passes through the center from which the semicircle that bounds one end of the furnace is struck. Fig. 2 is a horizontal section at the line *x x*, Fig. 1. Fig. 3 is a horizontal section taken at the dotted line *y y*, Fig 1.

In the several figures of the drawings the same parts of the furnace are designated by the same letter of reference.

The plan of the hearth and bosh of the furnace is (as is clearly seen at A A A, Figs. 2 and 3) of a long narrow form having semicircular ends. The outer surface, however, of the brick-work composing the sides of the bosh and cupola are slightly concave, as is also each side of the surrounding metallic jacket or shell, as clearly seen at Fig. 2. The object and advantage of this concavity is that as the brick-work expands (sooner than the shell) its pressure upon the internal surface of the shell will force its semicircular ends apart, thus straightening out its concave sides and enlarging or increasing the space bounded by the metallic shell to accommodate the expanded masonry. He has represented the inner face of the brick-work, (as seen at *a a a a a a*, Fig. 1,) running vertically part of the way and then tapered or flared slightly inward to the bottom of the bosh, (or to the plane where the blast enters,) but the shape of the internal face may be different—for instance, it may run straight down all the way without departing from the spirit of his invention. The cupola is surrounded by a metallic blast-chamber, *f*, which has a horizontal flange or projecting plate, *c*, extending all around its inner portion and on which rests the brick-work composing the bosh and cupola of the furnace. Below this flange *c* (see Fig. 1) is a continuous opening or channel extending from the blast-chamber *f* to the interior of the furnace, through which the blast enters, as indicated by the arrows at Figs. 1 and 3, and in which are arranged several small supporting-columns *d d d*, of brick or other material, which, resting on the bed-plate of the blast-chamber *f* serve to sustain or strengthen the flange or plate *c* on which the brick-work above rests.

The hearth *a a* is made to correspond in contour to the bosh, but is made a little wider and longer, so that the bottom of the bosh overhangs or projects inward over the sides of the hearth, as seen at *h*, Fig. 1. The hearth is provided with the usual "tap-hole" and dumping-doors, as seen at Fig. 1, and is supported on a suitable stand in the ordinary manner. *i i* are two openings in the upper side of blast-chamber through which the blast is supplied from a blower suitably connected by pipes to said chamber. To use this improved furnace the charge of fuel and metal or ores is put in in the usual manner and ignited, and the blast turned on and the manipulations performed as usual with other furnaces. It will be seen that the blast supplied to the surrounding chamber *f* will escape from said chamber into the fuel and other material at all points in the contour of the bosh (or mass therein contained) through open and continuous space *b*, as indicated by the arrows at Figs. 1 and 3.

As before mentioned, the lower portion of the brick-work over plate *c* (or the bosh) projects inward over the inner vertical face of the hearth, and it will be observed that the rectangular blocks *d d*, &c., are so arranged that the inmost portion of each does not extend inwardly beyond the face of the hearth, and is in about the same vertical plane with the vertical face of the hearth, as seen at *a′ a′*, Fig. 1. By thus constructing the furnace with the bosh projecting inwardly over the hearth where the blast enters, all liability of the blast-opening or tuyere-mouth to become clogged up, or "cat over," is effectually avoided, since the metal, &c., descending into the hearth, will naturally pass clear of said opening.

It will be observed that by the peculiar arrangement of the rectangular block *d d d*, (shown at Figs. 1 and 3,) with their angles or vertical corners nearest the furnace-chamber, the passage of the blast from chamber *f* to the interior of the furnace is very little impeded, and that it is allowed to enter in a completely surrounding sheet, (the blocks *d d d* presenting only knife-edges around which the blast flows or passes.) One of the most advantageous features of this improved furnace is its long narrow form of bosh, (and hearth,) in connection with the discharge of blast all along its sides, whereby the mass of fuel to be penetrated by the blast is presented in a comparatively thin vertical strata, and the blast introduced against both sides of said strata in continuous sheets, so that the mass is easily penetrated to its core by the blast without having the latter injuriously strong.

It is obvious that the surrounding blast-chamber and blast-opening or tuyere may be applied with great advantage to cupolas of other form or contour than that of this improved furnace, and it is equally obvious that the projecting inwardly of the bosh over the hearth where the blast enters, (which is an important feature of this invention,) may be practiced in the construction of furnaces in which the tuyere does not surround the furnace and which do not embrace the other features of this invention.

It will be understood that by the introduction of the blast in thin sheets along the sides of the furnace, (or in sheets penetrating radially in the case of a furnace of circular or polygonal form,) the blast is enabled to penetrate more thoroughly and act much more advantageously upon the contained mass than if it were introduced by a series of round tuyeres, as heretofore.

What we claim as new, of his invention, and desire to secure by Letters Patent, is—

1. A furnace of elongated form and having its surrounding shell concave on the sides, substantially as described, for the purpose set forth.

2. Introducing the blast in cupola or blast furnaces in a thin sheet or sheets, substantially as described, in contradistinction to a series of round jets, whereby the blast is caused to act more uniformly on the charge.

3. A furnace having the plan of its bosh of a shape substantially like that shown and provided with a means for the introduction of the blast all along both sides, whereby the mass of fuel and metal is presented in a thin vertical strata to the action of two continuous sheets of blast entering at the opposite sides of the furnace, substantially as and for the purpose set forth hereinbefore.

4. Projecting the inner edge of the bosh (or the inner lower portion of the furnace-chamber) inwardly beyond the tuyere or blast opening to prevent the clogging of the blast-opening or tuyere-mouths, substantially as described.

ADDISON SMITH. [L. S.]
JAS. M. SAYRE. [L. S.]

Witnesses:
WM. G. CHANE,
G. W. CORNING.